US012759697B2

(12) United States Patent
Sturgin et al.

(10) Patent No.: US 12,759,697 B2
(45) Date of Patent: Oct. 13, 2026

(54) LINEAR ACTUATOR FOR A FLIGHT CONTROL SURFACE

(71) Applicant: Schaeffler Technologies AG & Co. KG, Herzogenaurach (DE)

(72) Inventors: Todd Sturgin, Wooster, OH (US); Craig Hooker, Indian Land, SC (US); Nicholas Hrusch, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 358 days.

(21) Appl. No.: 18/595,819

(22) Filed: Mar. 5, 2024

(65) Prior Publication Data

US 2025/0145276 A1 May 8, 2025

Related U.S. Application Data

(60) Provisional application No. 63/547,465, filed on Nov. 6, 2023.

(51) Int. Cl.

*F16H 25/20* (2006.01)
*B64C 13/34* (2006.01)
*B64C 13/50* (2006.01)

(52) U.S. Cl.

CPC .............. *B64C 13/34* (2013.01); *B64C 13/50* (2013.01)

(58) Field of Classification Search

CPC ......... B64C 13/34; B64C 13/50; B64C 13/30; F16H 2025/2043; F16H 2025/2059; F16H 25/06

See application file for complete search history.

(56) References Cited

U.S. PATENT DOCUMENTS

| | | | | |
|---|---|---|---|---|
| 5,289,096 | A * | 2/1994 | Takeda | B21D 28/002 318/560 |
| 8,201,467 | B2 * | 6/2012 | Johnson | H02K 7/06 74/831 |
| 10,017,243 | B2 | 7/2018 | Moser et al. | |
| 10,527,142 | B2 | 1/2020 | Nguyen et al. | |
| 10,633,080 | B2 | 4/2020 | Huynh et al. | |
| 11,117,339 | B2 * | 9/2021 | Li | B30B 9/322 |
| 11,505,304 | B2 | 11/2022 | Tsai et al. | |

OTHER PUBLICATIONS

Ewellix, "Precision rail guides catalogue," LWM / LWV ACSZ precision rail guide specifications, Feb. 2023, pp. 75-78.

* cited by examiner

*Primary Examiner* — Gregory Robert Weber
(74) *Attorney, Agent, or Firm* — Price Heneveld LLP

(57) ABSTRACT

A linear actuator for a flight control surface including at least one electric motor, a threaded shaft rotationally driven via the at least one motor about a threaded shaft pivot axis, first and second threaded nuts axially displaced via rotation of the threaded shaft, and an output shaft coupled to the threaded shaft, such that axial displacement of the first and second threaded nuts rotates the output shaft about an output shaft pivot axis that is substantially parallel with the threaded shaft pivot axis. Rotation of the threaded shaft in a first rotational direction via the at least one motor prompts movement of the first and second threaded nuts axially toward each other. Further, rotation of the threaded shaft in a second rotational direction opposite the first rotational direction via the at least one motor prompts movement of the first and second threaded nuts axially away from each other.

18 Claims, 11 Drawing Sheets

LINEAR ACTUATOR FOR A FLIGHT CONTROL SURFACE

CROSS-REFERENCE TO RELATED APPLICATIONS

This application claims the benefit of priority under 35 U.S.C. § 119 of U.S. Provisional Application No. 63/547,465, filed on Nov. 6, 2023, the entire contents of which are incorporated herein by reference.

FIELD OF THE DISCLOSURE

The disclosure is generally related to an actuator for a flight control surface of an aircraft.

BACKGROUND OF THE DISCLOSURE

Actuators can be used in a variety of aerospace applications to move a flight control surface to a desired location, position, or angle. Flight control surfaces can include, but are not limited to, flaps, ailerons, spoilers, slats, elevators, rotors, and tabs.

SUMMARY OF THE DISCLOSURE

According to a first aspect of the present disclosure, a linear actuator for a flight control surface includes at least one electric motor, a threaded shaft rotationally driven via the at least one electric motor about a threaded shaft pivot axis, a first threaded nut axially displaced via rotation of the threaded shaft, a second threaded nut axially displaced via rotation of the threaded shaft, and an output shaft operably coupled to the threaded shaft, such that axial displacement of the first and second threaded nuts rotates the output shaft about an output shaft pivot axis that is substantially parallel with the threaded shaft pivot axis. Rotation of the threaded shaft in a first rotational direction via the at least one electric motor prompts movement of the first and second threaded nuts axially toward each other. Further, rotation of the threaded shaft in a second rotational direction opposite the first rotational direction via the at least one electric motor prompts movement of the first and second threaded nuts axially away from each other.

Embodiments of the first aspect of the disclosure can include any one or a combination of the following features:

- the first and second threaded nuts are hingedly connected to the output shaft;
- a first input coupler pivotably coupled to the first threaded nut, a second input coupler pivotably coupled to the second threaded nut, at least one output coupler pivotably coupled to the output shaft, at least one first coupler link pivotably coupled to the first input coupler and the at least one output coupler, and at least one second coupler link pivotably coupled to the second input coupler and the at least one output coupler;
- the at least one output coupler is pivotably coupled with the output shaft, such that the at least one output coupler is operable to pivot relative to the output shaft about a pivot axis that is substantially parallel to the output shaft pivot axis;
- the first input coupler is pivotably coupled to the first threaded nut, such that the first input coupler is operable to pivot relative to the first threaded nut about a pivot axis that is substantially parallel to the threaded shaft pivot axis, and the second input coupler is pivotably coupled to the second threaded nut, such that the second input coupler is operable to pivot relative to the second threaded nut about a pivot axis that is substantially parallel to the threaded shaft pivot axis;
- the at least one first coupler link is pivotably coupled to the first input coupler and pivotably coupled to the at least one output coupler, such that the at least one first coupler link is operable to pivot relative to the first input coupler about a pivot axis that is substantially perpendicular to the threaded shaft pivot axis and pivot relative to the at least one output coupler about a pivot axis that is substantially perpendicular to the output shaft pivot axis, and wherein the at least one second coupler link is pivotably coupled to the second input coupler and pivotably coupled to the at least one output coupler, such that the at least one second coupler link is operable to pivot relative to the second input coupler about a pivot axis that is substantially perpendicular to the threaded shaft pivot axis and pivot relative to the at least one output coupler about a pivot axis that is substantially perpendicular to the output shaft pivot axis;
- the at least one output coupler includes a first output coupler pivotably coupled with the output shaft, and a second output coupler pivotably coupled with the output shaft independently of the first output coupler, and wherein the at least one first coupler link is pivotably coupled with the first output coupler, and the at least one second coupler link is pivotably coupled with the second output coupler;
- the at least one first coupler link includes a pair of first coupler links, each being pivotably coupled to the first input coupler and pivotably coupled to the at least one output coupler; and
- the at least one second coupler link includes a pair of second coupler links, each being pivotably coupled to the second input coupler and pivotably coupled to the at least one output coupler.

According to a second aspect of the present disclosure, a linear actuator for a flight control surface includes first and second electric motors, a threaded shaft, a first threaded nut, a second threaded nut, and an output shaft. The threaded shaft is rotationally driven via the first and second electric motors about a threaded shaft pivot axis. The threaded shaft is operably coupled with the first electric motor via a first gear train and a first planetary gearset, and the threaded shaft is operably coupled with the second electric motor via a second gear train and a second planetary gearset. The first threaded nut is axially displaced via rotation of the threaded shaft. The second threaded nut is axially displaced via rotation of the threaded shaft. Further, the output shaft is operably coupled with the threaded shaft, such that axial displacement of the first and second threaded nuts rotates the output shaft about an output shaft pivot axis that is substantially parallel with the threaded shaft pivot axis.

Embodiments of the second aspect of the disclosure can include any one or a combination of the following features:

- rotation of the threaded shaft in a first rotational direction via the first and second electric motors prompts movement of the first and second threaded nuts axially toward each other, and rotation of the threaded shaft in a second rotational direction opposite the first rotation direction via the first and second electric motors prompts movement of the first and second threaded nuts axially away from each other;
- the first and second threaded nuts are hingedly connected to the output shaft;

a first input coupler pivotably coupled to the first threaded nut, a second input coupler pivotably coupled to the second threaded nut, at least one output coupler pivotably coupled to the output shaft, at least one first coupler link pivotably coupled to the first input coupler and the at least one output coupler, and at least one second coupler link pivotably coupled to the second input coupler and the at least one output coupler;

the at least one output coupler is pivotably coupled with the output shaft, such that the at least one output coupler is operable to pivot relative to the output shaft about a pivot axis that is substantially parallel to the output shaft pivot axis;

the first input coupler is pivotably coupled to the first threaded nut, such that the first input coupler is operable to pivot relative to the first threaded nut about a pivot axis that is substantially parallel to the threaded shaft pivot axis, and the second input coupler is pivotably coupled to the second threaded nut, such that the second input coupler is operable to pivot relative to the second threaded nut about a pivot axis that is substantially parallel to the threaded shaft pivot axis; and the at least one first coupler link is pivotably coupled to the first input coupler and pivotably coupled to the at least one output coupler, such that the at least one first coupler link is operable to pivot relative to the first input coupler about a pivot axis that is substantially perpendicular to the threaded shaft pivot axis and pivot relative to the at least one output coupler about a pivot axis that is substantially perpendicular to the output shaft pivot axis, and wherein the at least one second coupler link is pivotably coupled to the second input coupler and pivotably coupled to the at least one output coupler, such that the at least one second coupler link is operable to pivot relative to the second input coupler about a pivot axis that is substantially perpendicular to the threaded shaft pivot axis and pivot relative to the at least one output coupler about a pivot axis that is substantially perpendicular to the output shaft pivot axis.

According to a third aspect of the present disclosure, a linear actuator includes at least one electric motor, a threaded shaft rotationally driven via the at least one electric motor about a threaded shaft pivot axis, at least one threaded nut axially displaced along the threaded shaft pivot axis via rotation of the threaded shaft, and an output shaft operably coupled to the threaded shaft, such that axial displacement of the at least one threaded nut rotates the output shaft about an output shaft pivot axis that is substantially parallel with the threaded shaft pivot axis.

Embodiments of the third aspect of the disclosure can include any one or a combination of the following features:

the at least one threaded nut is hingedly connected to the output shaft;

a first input coupler pivotably coupled to the at least one threaded nut, at least one output coupler pivotably coupled to the output shaft, and at least one first coupler link pivotably coupled to the first input coupler and the at least one output coupler; and the first input coupler is operable to pivot relative to the at least one threaded nut about a pivot axis that is substantially parallel to the threaded shaft pivot axis, the at least one output coupler is operable to pivot relative to the output shaft about a pivot axis that is substantially parallel to the output shaft pivot axis, and the at least one first coupler link is operable to pivot relative to the first input coupler about a pivot axis that is substantially perpendicular to the threaded shaft pivot axis and pivot relative to the at least one output coupler about a pivot axis that is substantially perpendicular to the output shaft pivot axis.

These and other features, advantages, and objects of the present disclosure will be further understood and appreciated by those skilled in the art by reference to the following specification, claims, and appended drawings.

Figure 1:
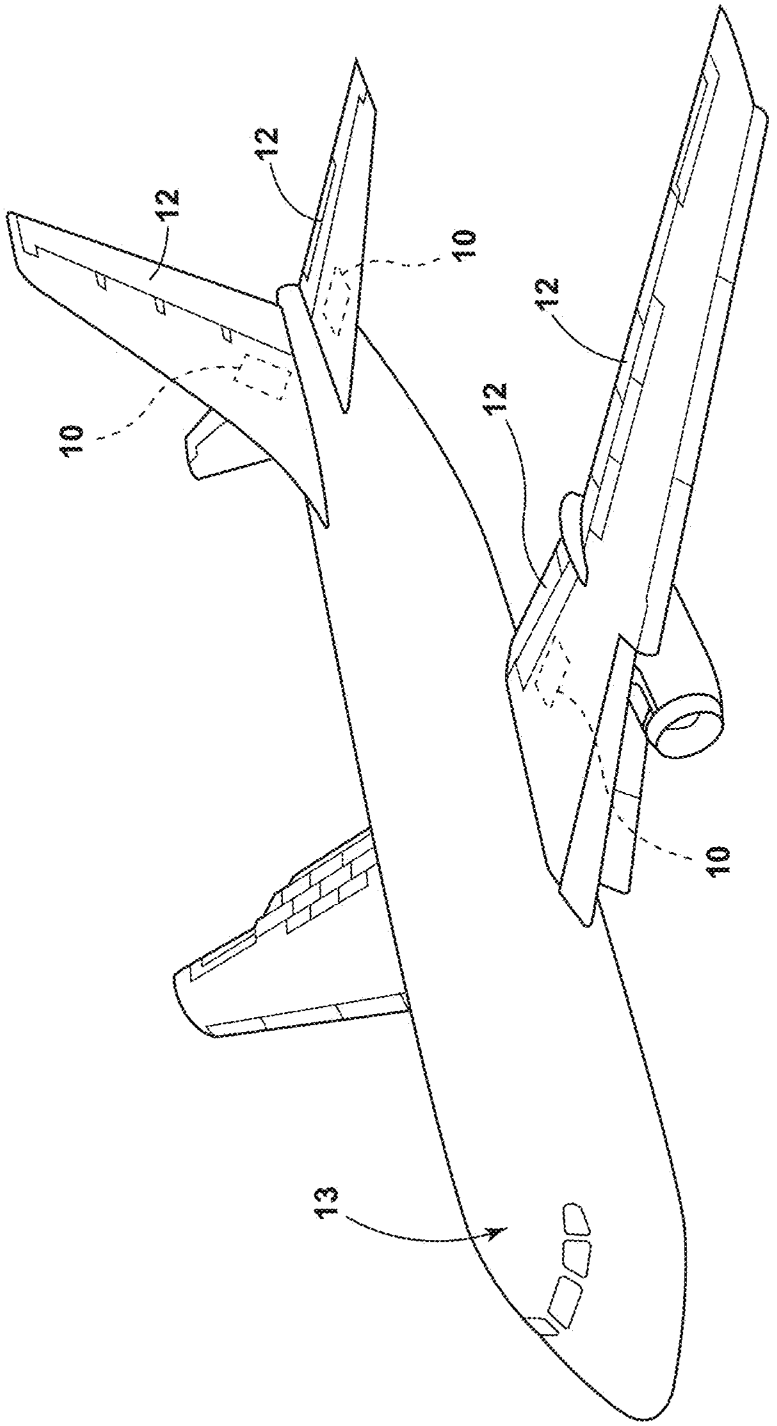
FIG. 1 is a perspective view of an aircraft that includes a plurality of linear actuators, according to one embodiment.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis. The term "circumferential" and derivatives thereof, such as "circumferentially," shall be understood in relation to the axis of the aforementioned shaft.

Referring now to FIGS. 1-11, a linear actuator 10 is disclosed. The linear actuator 10 may be configured to operate a flight control surface 12 of an aircraft 13, in some embodiments, as illustrated exemplary in FIG. 1. A variety of types of aircrafts 13 (e.g., plane, jet, drone, etc.) and flight control surfaces 12 (e.g., flaps, ailerons, spoilers, slats, elevators, rotors, tabs, etc.) are contemplated. The linear actuator 10 can include at least one electric motor 14. A threaded shaft 16 can be rotationally driven via the at least one electric motor 14 about a threaded shaft pivot axis 18. A first threaded nut 20A may be axially displaced via rotation of the threaded shaft 16. A second threaded nut 20B may be axially displaced via rotation of the threaded shaft 16. The linear actuator 10 may further include an output shaft 22 that is arranged parallel to the threaded shaft 16 and is operably coupled thereto. Axial displacement of the first and second threaded nuts 20A, 20B may rotate the output shaft 22 about an output shaft pivot axis 24 that is substantially parallel with the threaded shaft pivot axis 18 via the operable coupling of the output shaft 22 and the threaded shaft 16, as described further herein.

Figure 2:
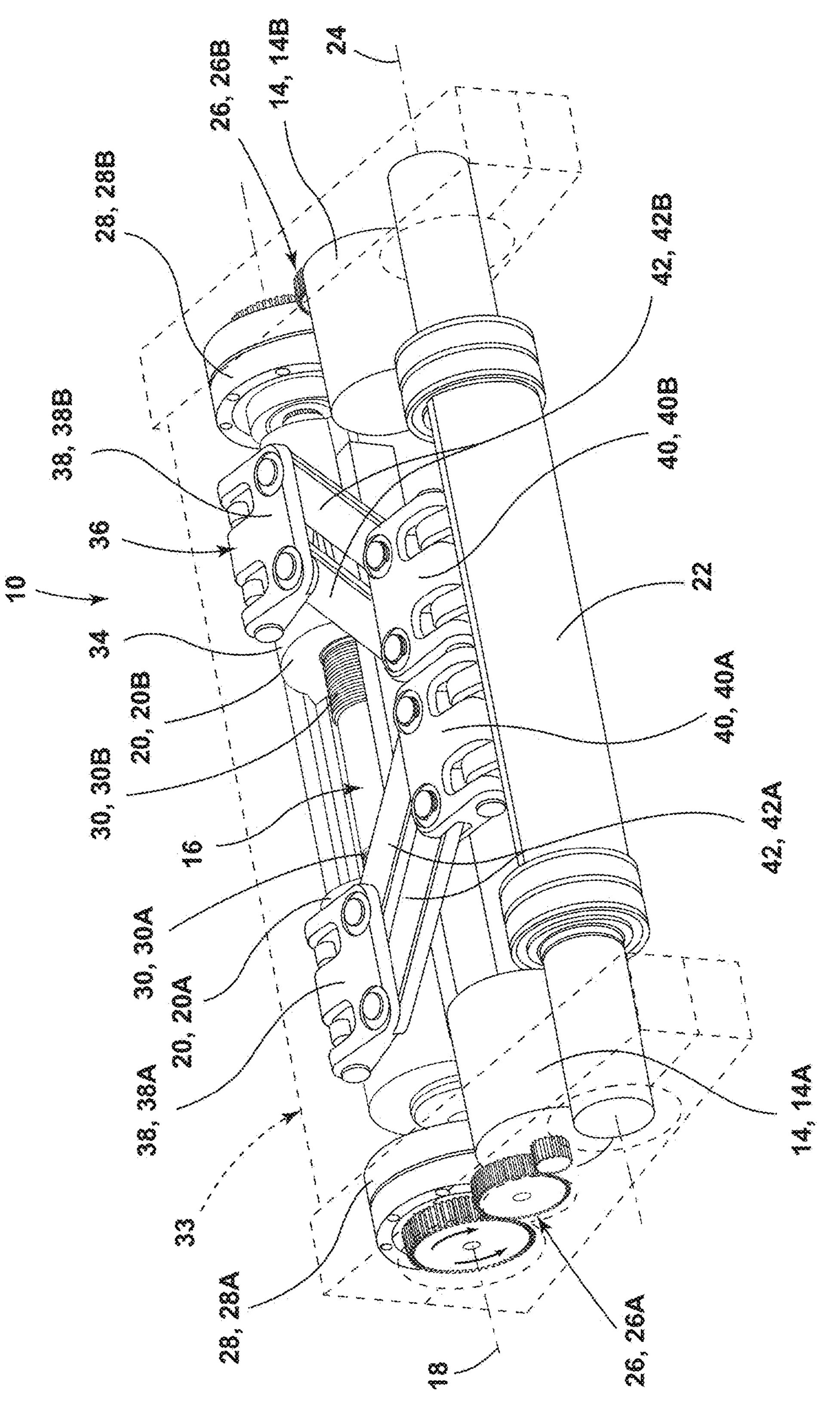
FIG. 2 is a perspective view of a linear actuator for a flight control surface, according to one embodiment.
Figure 3:
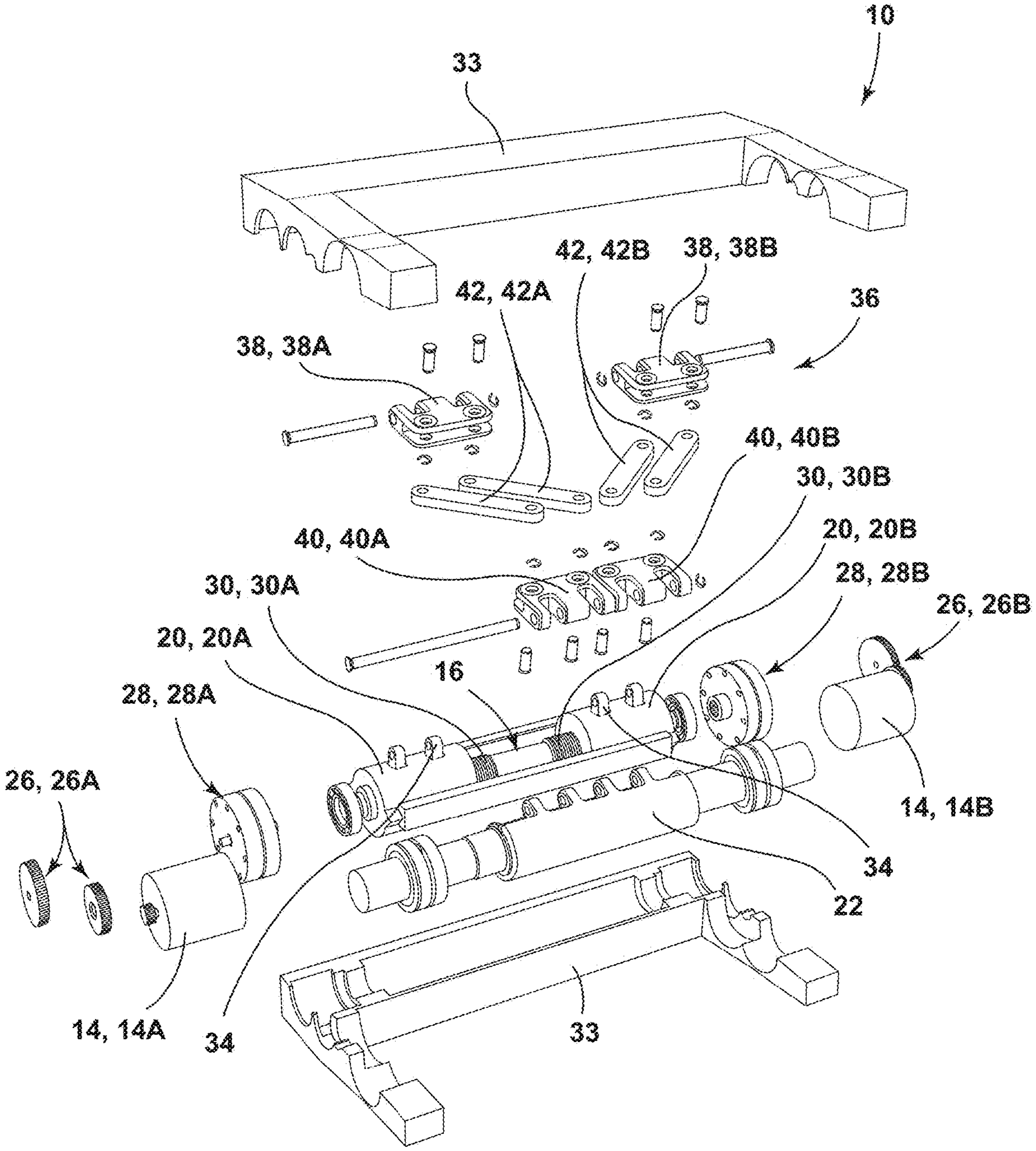
FIG. 3 is an exploded view of a linear actuator for a flight control surface, according to one embodiment.

Referring now to FIGS. 2 and 3, the linear actuator 10 can include at least one electric motor 14. In the embodiment illustrated in FIGS. 2 and 3, the linear actuator 10 includes a first electric motor 14A and a second electric motor 14B. As illustrated in FIGS. 2 and 3, the at least one electric motor 14 is configured to be operably coupled with the threaded shaft 16 via a gear train 26 and/or a gearset 28. In the embodiment illustrated in FIGS. 2 and 3, the first electric motor 14A is operably coupled with the threaded shaft 16 at a first axial end of the threaded shaft 16 via a first gear train 26A and a first planetary gearset 28A that operably couples the first gear train 26A and the threaded shaft 16. Further, the second electric motor 14B is operably coupled with a second axial end of the threaded shaft 16 via a second gear train 26B and a second planetary gearset 28B. It is contemplated that the at least one electric motor 14 of the linear actuator 10 may be operably coupled with the threaded shaft 16 via a plurality of gearsets 28, in some implementations. For example, the first electric motor 14A can be operably coupled with the threaded shaft 16 via the first gear train 26A and a plurality of planetary gearsets 28 arranged in series, in some embodiments.

Referring still to FIGS. 2 and 3, the threaded shaft 16 of the linear actuator 10 is configured to rotate about the threaded shaft pivot axis 18. In various implementations, the at least one electric motor 14 drives rotation of the threaded shaft 16 in either a first direction or a second direction opposite the first direction. The threaded shaft 16 includes threads 30. In various implementations, the threaded shaft 16 includes first threads 30A and second threads 30B. The first and second threads 30A, 30B may be threaded in opposite directions. For example, the first threads 30A of the threaded shaft 16 may be configured as right-handed threads, and the second threads 30B may be configured as left-handed threads. Opposite arrangements are contemplated. The threaded shaft 16 may be one or more of a variety of types of threaded shafts, such as a roller screw shaft, in various embodiments. The threaded shaft 16 may be supported by bearings 32, such as rolling element bearings, that are coupled with a housing 33 of the linear actuator 10, such as the two-piece housing illustrated in FIGS. 2 and 3.

Referring still to FIGS. 2 and 3, the linear actuator 10 includes at least one threaded nut 20 that is operably coupled with the threaded shaft 16 of the linear actuator 10. In various implementations, the at least one threaded nut 20 is engaged with threads 30 of the threaded shaft 16 via a threaded interface between the threaded nut 20 and the threaded shaft 16. Rotational movement of the threaded shaft 16 is configured to prompt linear movement of the at least one threaded nut 20 along the threaded shaft pivot axis 18. As such, the threaded shaft pivot axis 18 may also represent a translational axis of the at least one threaded nut 20. In various implementations, rotation of the threaded shaft 16 about the threaded shaft pivot axis 18 in the first direction causes axial movement of the at least one threaded nut 20 in a first axial direction, and rotational movement of the threaded shaft 16 in the second direction causes axial movement of the at least one threaded nut 20 in a second axial direction opposite the first axial direction.

In various implementations, the linear actuator 10 includes a plurality of threaded nuts 20. For example, as illustrated in the embodiment of the linear actuator 10 shown in FIG. 2, the linear actuator 10 includes a first threaded nut 20A and a second threaded nut 20B. The first threaded nut 20A is operably engaged with the first threads 30A of the threaded shaft 16, and the second threaded nut 20B is operably engaged with the second threads 30B of the threaded shaft 16. In various embodiments, the threaded interface between the threaded shaft 16 and the first and second threaded nuts 20A, 20B, respectively, results in linear convergence of the first and second threaded nuts 20A, 20B due to rotation of the threaded shaft 16 in the first direction and linear divergence of the threaded nuts 20 via rotation of the threaded shaft 16 in the second direction. In other words, rotation of the threaded shaft 16 in the first rotational direction via the at least one electric motor 14 prompts movement of the first and second threaded nuts 20A, 20B axially toward each other, and rotation of the threaded shaft 16 in a second rotational direction opposite the first rotational direction via the at least one electric motor 14 prompts movement of the first and second threaded nuts 20A, 20B axially away from each other.

In some implementations of the linear actuator 10, the at least one threaded nut 20 and the threads 30 of the threaded shaft 16 may define a ball screw drive in which rolling elements (e.g., balls) are arranged between the threads 30 of the threaded shaft 16 and the corresponding threads 30 of the at least one threaded nut 20. In some implementations, the at least one threaded nut 20 of the linear actuator 10 and the threads 30 of the threaded shaft 16 may define a planetary roller screw assembly or a planetary roller screw drive, as illustrated exemplarily in FIG. 10. Such an assembly may include threaded planetary rollers between the threads 30 of the at least one threaded nut 20 and the threads 30 of the threaded shaft 16. Planetary roller screw assemblies may advantageously provide high load capacities. It is contemplated that a variety of embodiments of the assembly of the threaded shaft 16 and the at least one threaded nut 20 are contemplated.

Referring now to FIGS. 2, 3, 10, and 11, in various embodiments, at least a portion of the at least one threaded nut 20 maintains its circumferential position relative to the threaded shaft pivot axis 18 during rotation of the threaded shaft 16 and axial movement of the at least one threaded nut 20 therealong. For example, in the embodiment illustrated in FIG. 10, an outer body 34 of the threaded nut 20 is configured to substantially maintain its circumferential position with respect to the threaded shaft pivot axis 18 during operation of the linear actuator 10. In various implementations, one or more bearings 32 support and facilitate translational movement of the at least one threaded nut 20 of the linear actuator 10. For example, in the embodiment illustrated in FIG. 11, an M and V bearing 32 is shown and configured to provide linear guidance and support to the at least one threaded nut 20, as well as prevent rotation of at least a portion of the at least one threaded nut 20 during operation of the linear actuator 10. It is contemplated that a pair of opposing M and V bearings 32 may be disposed on opposite sides of the at least one threaded nut 20 to accomplish the support, anti-rotation, and linear guidance of the at least one threaded nut 20, as illustrated exemplarily in the embodiments shown in FIGS. 5 and 7. It is contemplated that a variety of types of support and guidance means may be utilized in conjunction with the at least one threaded nut 20 (e.g., spline and groove system, etc.).

Referring now to FIGS. 2 and 3, the linear actuator 10 includes the output shaft 22. The output shaft 22 is operable to rotate about the output shaft pivot axis 24. In various implementations, the output shaft pivot axis 24 is substantially parallel with the threaded shaft pivot axis 18, as illustrated in FIG. 2. In various implementations, the output shaft 22 is operably coupled to the threaded shaft 16, such that rotation of the threaded shaft 16 about the threaded shaft pivot axis 18 prompts rotation of the output shaft 22 about the output shaft pivot axis 24. For example, a connection assembly 36 that extends between the output shaft 22 and the at least one threaded nut 20 that is operably coupled with the threaded shaft 16 may operably couple the output shaft 22 and the threaded shaft 16, such that rotation of the threaded shaft 16 drives rotation of the output shaft 22, as described further herein.

Figure 4:
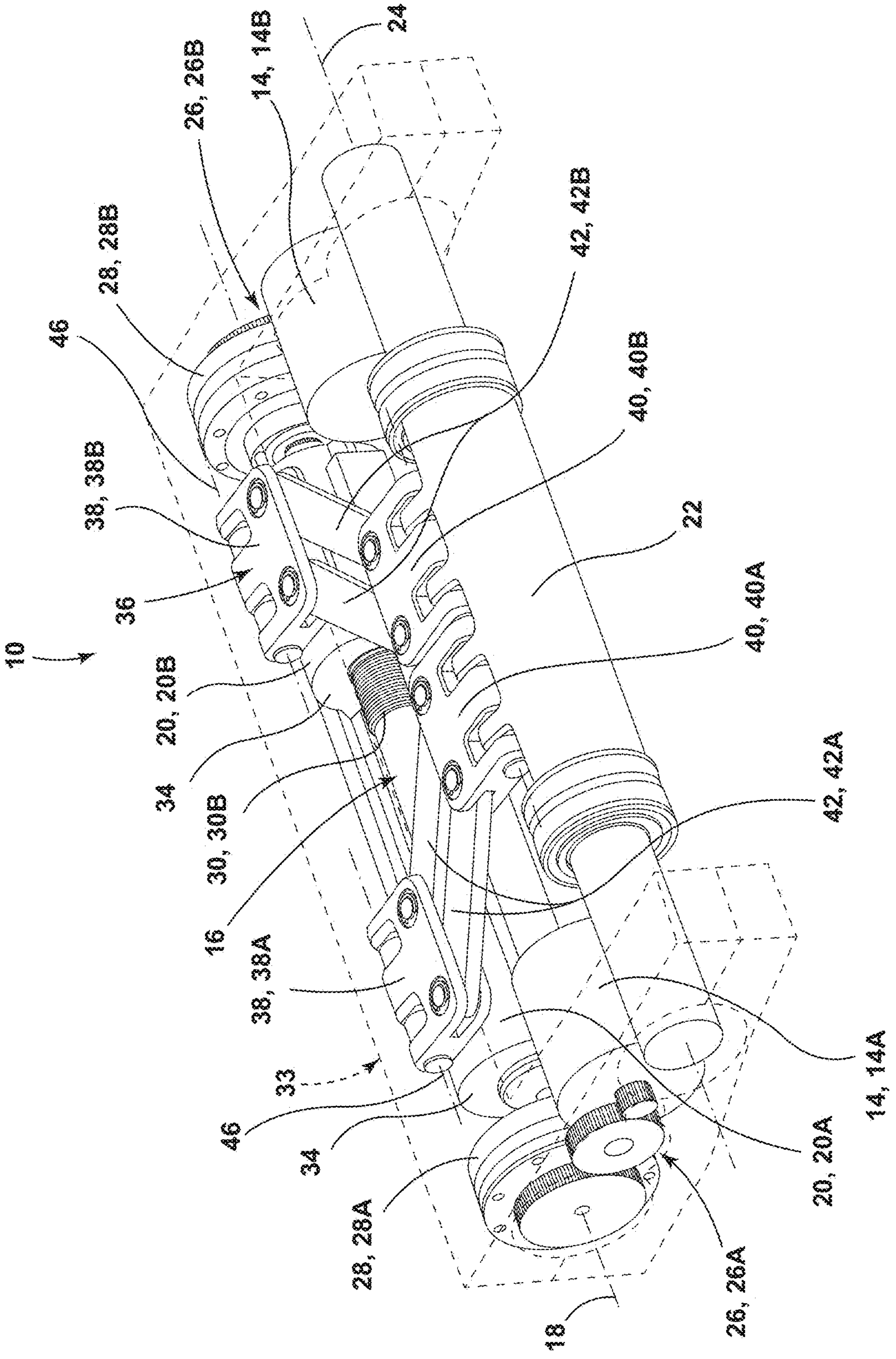
FIG. 4 is a perspective view of a linear actuator for a flight control surface, according to one embodiment.
Figure 7:
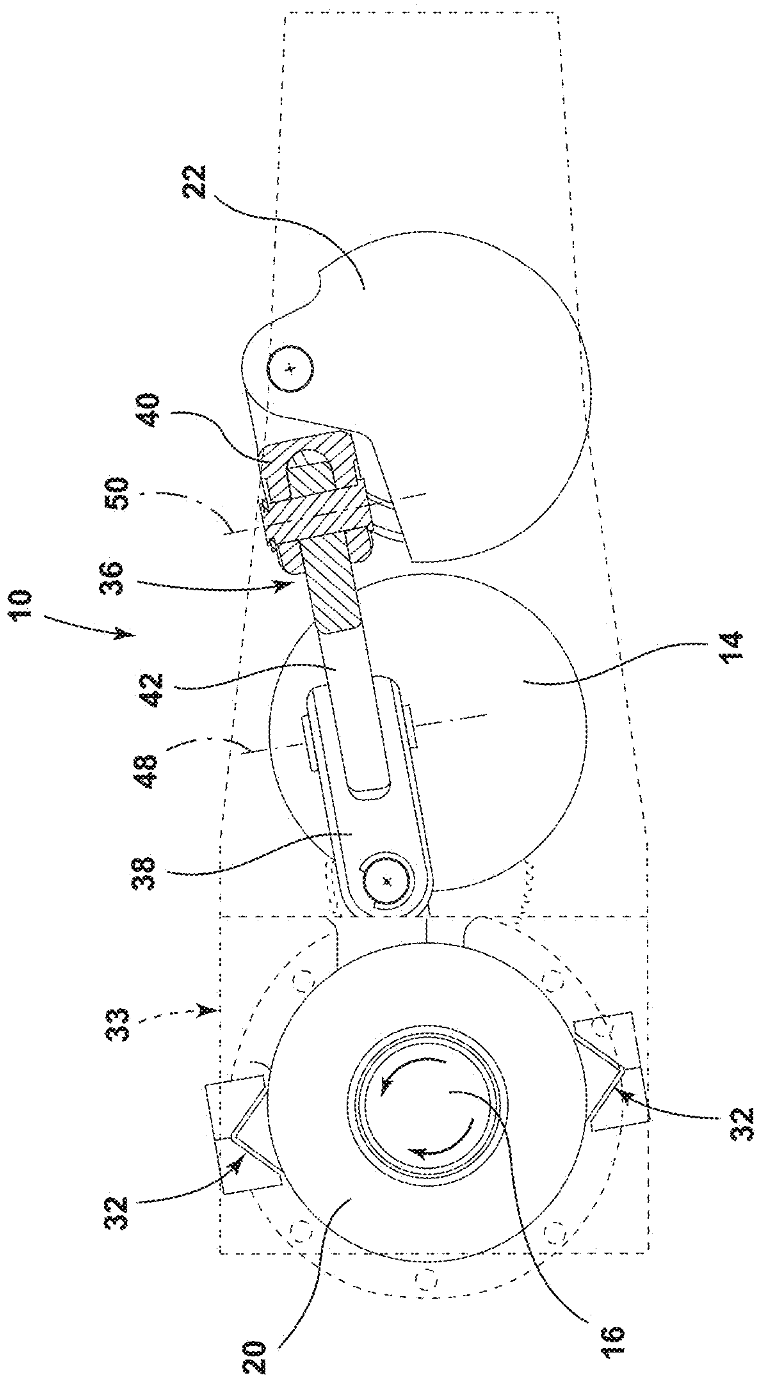
FIG. 7 is a cross-sectional view of the linear actuator of FIG. 6, according to one embodiment.
Figure 8:
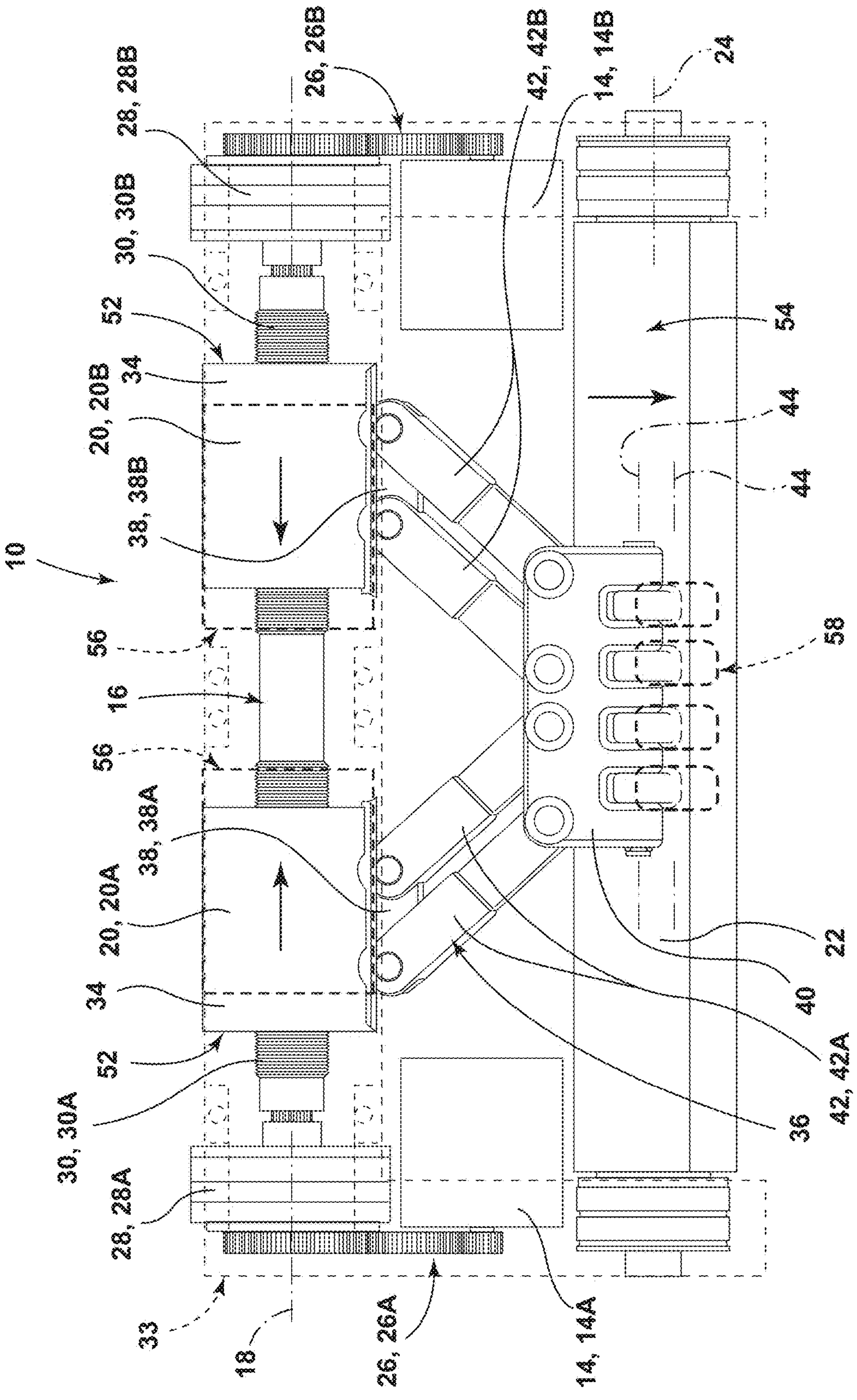
FIG. 8 is an elevational view of a linear actuator for a flight control surface, illustrating linearly convergent positions of first and second threaded nuts of the linear actuator in phantom, according to one embodiment.

Referring now to FIGS. 2-9, the at least one threaded nut 20 may be hingedly connected to the output shaft 22 via the connection assembly 36, such that axial movement of the at least one threaded nut 20 in a first direction causes rotation of the output shaft 22 in a first direction, and axial movement of the at least one threaded nut 20 in a second axial direction causes rotational movement of the output shaft 22 in a second rotational direction opposite the first rotational direction. In various implementation, the connection assembly 36 includes an input coupler 38 pivotably coupled to the at least one threaded nut 20, an output coupler 40 pivotally coupled to the output shaft 22, and a coupler link 42 pivotably coupled to the input coupler 38 and the output coupler 40. In various implementations, the connection assembly 36 can include a plurality of input couplers 38, output couplers 40, and coupler links 42. For example, as illustrated in FIGS. 2-9, the linear actuator 10 includes a first input coupler 38A that is pivotably coupled to the first threaded nut 20A, a second input coupler 38B that is pivotally coupled to the second threaded nut 20B, a first output coupler 40A that is pivotably coupled to the output shaft 22, a second output coupler 40B that is pivotably coupled to the output shaft 22, a pair of first coupler links 42A that are pivotably coupled to the first input coupler 38A and the first output coupler 40A, and a pair of second coupler links 42B that are pivotably coupled to the second input coupler 38B and the second output coupler 40B. In various implementations, at least one output coupler 40 of the connection assembly 36 is pivotably coupled with the output shaft 22, such that the at least one output coupler 40 is operable to pivot relative to the output shaft 22 about a pivot axis 44 that is substantially parallel to the output shaft pivot axis 24, as illustrated in FIG. 8. With respect to the embodiment illustrated in FIGS. 2-9, the first input coupler 38A is pivotably coupled to the first threaded nut 20A, such that the first input coupler 38A is operable to pivot relative to the first threaded nut 20A about a pivot axis 46 that is substantially parallel to the threaded shaft pivot axis 18, as illustrated in FIG. 4. Further, the second input coupler 38B is pivotably coupled to the second threaded nut 20B, such that the second input coupler 38B is operable to pivot relative to the second threaded nut 20B about a pivot axis 46 that is substantially parallel to the threaded shaft pivot axis 18, as illustrated in FIG. 4.

Figure 5:
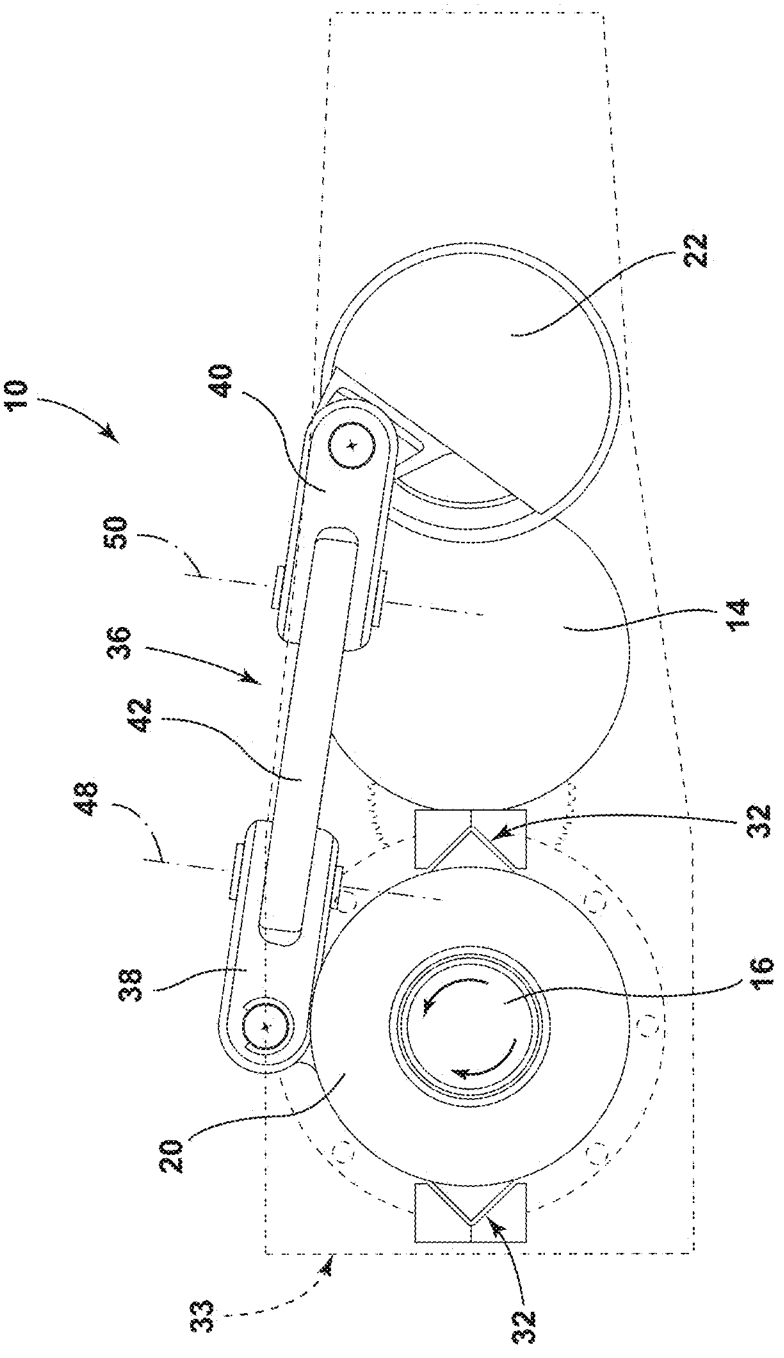
FIG. 5 is a cross-sectional view of the linear actuator of FIG. 4, according to one embodiment.
Figure 6:
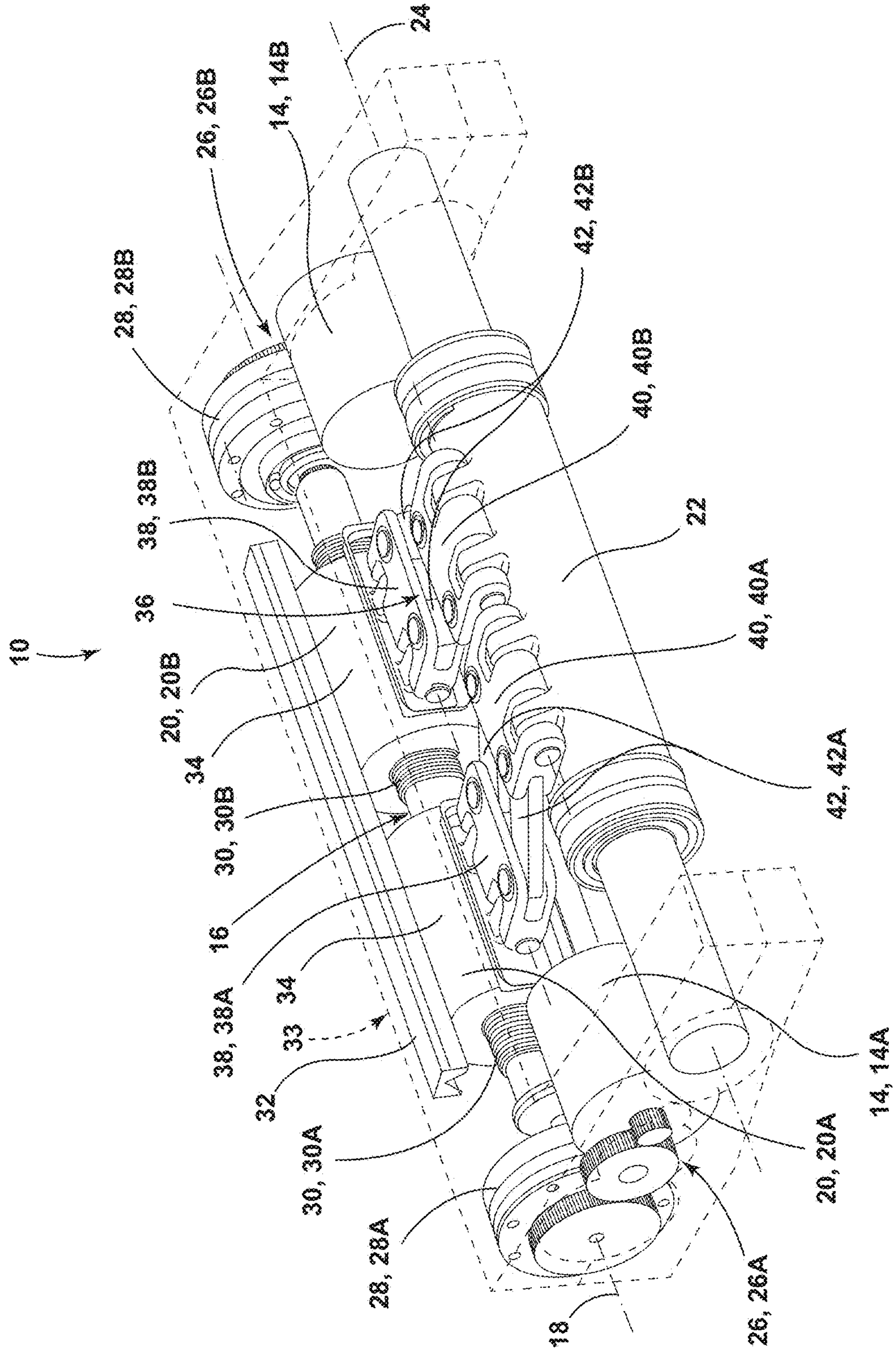
FIG. 6 is a perspective view of a linear actuator for a flight control surface, according to one embodiment.

Referring still to FIGS. 2-9, in some implementations, at least one first coupler link 42A of the connection assembly 36 is pivotably coupled to the first input coupler 38A and pivotably coupled to the at least one output coupler 40, such that the at least one first coupler link 42A is operable to pivot relative to the first input coupler 38A about a pivot axis 48 that is substantially perpendicular to the threaded shaft pivot axis 18 and pivot relative to the at least one output coupler 40 about a pivot axis 50 that is substantially perpendicular to the output shaft pivot axis 24, as illustrated in FIGS. 5 and 7. Further, in various implementations, at least one second coupler link 42B is pivotably coupled to the second input coupler 38B and pivotably coupled to at least one output coupler 40, such that the at least one second coupler link 42B is operable to pivot relative to the second input coupler 38B about a pivot axis 48 that is substantially perpendicular to the threaded shaft pivot axis 18 and pivot relative to the at least one output coupler 40 about a pivot axis 50 that is substantially perpendicular to the output shaft pivot axis 24, as illustrated in FIGS. 5 and 7.

Figure 9:
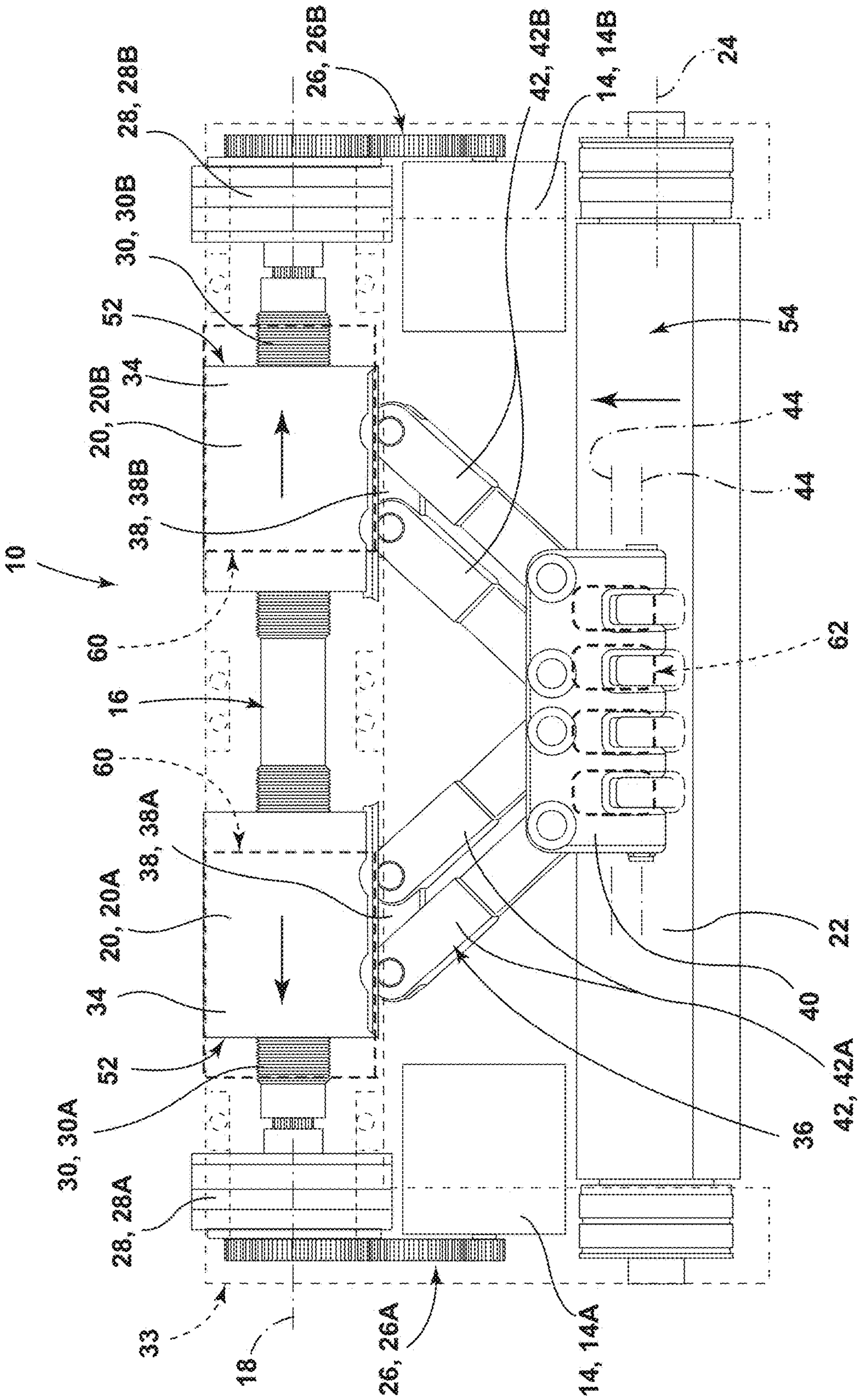
FIG. 9 is an elevational view of a linear actuator for a flight control surface, illustrating linearly divergent positions of the first and second threaded nuts of the linear actuator in phantom, according to one embodiment.
Figure 10:
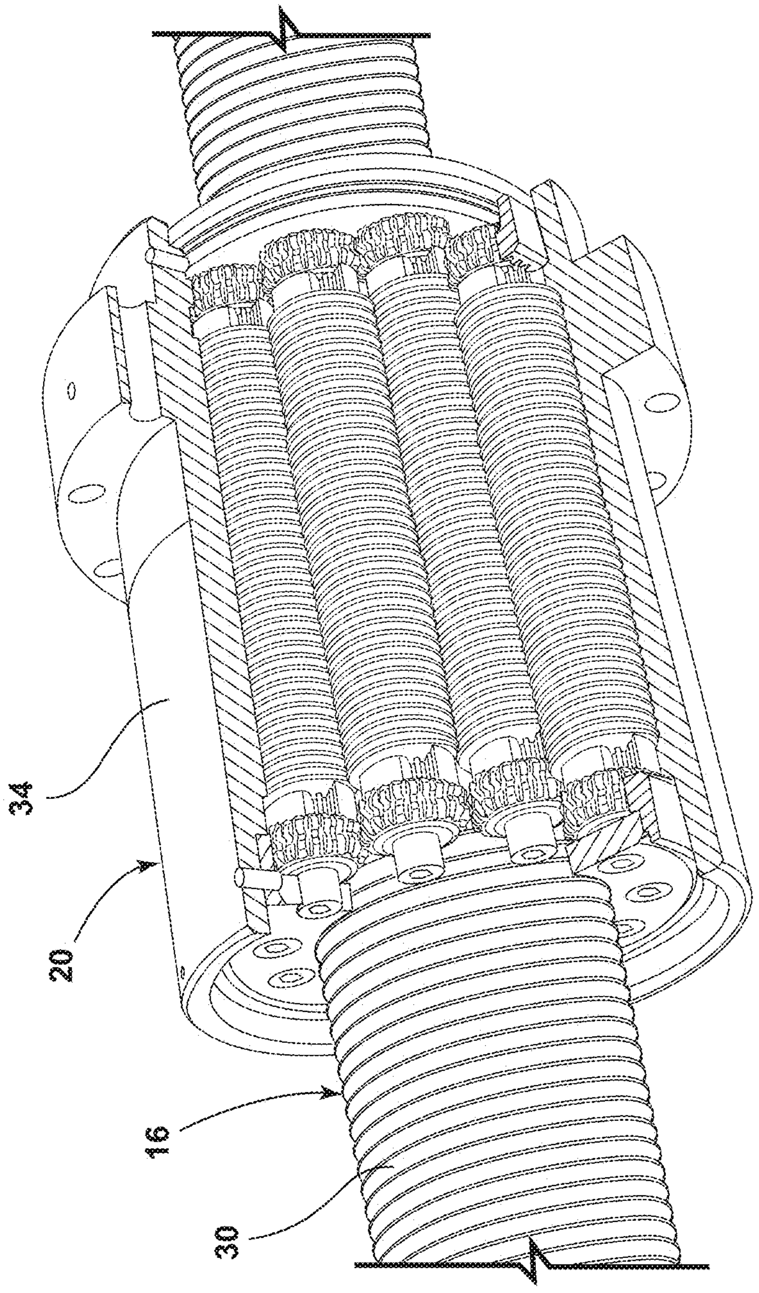
FIG. 10 is a perspective view of a portion of a planetary roller assembly, according to one embodiment.
Figure 11:
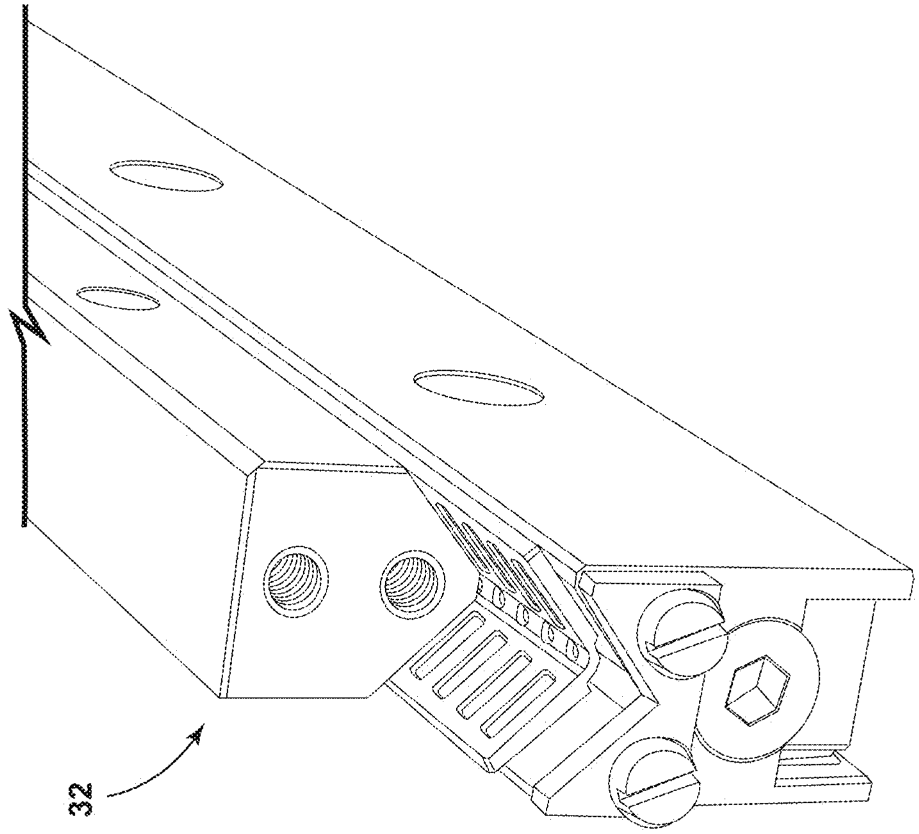
FIG. 11 is a perspective view of an "M and V" bearing, according to one embodiment.

Referring now to FIGS. 8 and 9, an exemplary embodiment of the linear actuator 10 is illustrated. As shown in FIGS. 8 and 9, the first and second threaded nuts 20A, 20B are illustrated at respective intermediate positions 52 relative to the first and second threads 30A, 30B of the threaded shaft 16 with which the first and second nuts 20A, 20B are respectively engaged. Further, the output shaft 22 is in an intermediate rotational position 54. As illustrated in FIG. 8, linearly convergent positions 56 of the first and second threaded nuts 20A, 20B along the threaded shaft 16 are illustrated in phantom. Further, a first rotational position 58 of the output shaft 22, wherein the output shaft 22 is rotated in a first direction relative to the intermediate rotational position 54 of the output shaft 22, is illustrated in phantom. As shown in FIG. 9, linearly divergent positions 60 of the first and second threaded nuts 20A, 20B along the threaded shaft 16 are illustrated in phantom. Further, a second rotational position 62 of the output shaft 22, wherein the output shaft 22 is rotated in a second rotational direction opposite the first rotational direction of the output shaft 22 relative to the intermediate rotational position 54 of the output shaft 22, is illustrated in phantom. As shown in FIGS. 8 and 9, the pivot axis 44 about which the at least one output coupler 40 pivots relative to the output shaft 22 is configured to rotate between the first rotational position 58 of the output shaft 22 and the second rotational position 62 of the output shaft 22 in correspondence with axial movement of the first and second threaded nuts 20A, 20B from the linearly convergent positions 56 to the linearly divergent positions 60.

The linear actuator 10 of the present disclosure may provide a variety of advantages. First, the linear actuator 10 including first and second electric motors 14A, 14B may allow for each motor 14 to operate at half or less than half of the maximum torque limit of the electric motor 14, such that, in the event of failure of one of the electric motors 14, the other may provide the necessary torque output to operate the linear actuator 10. Second, the connection assembly 36 coupling the threaded shaft 16 and the output shaft 22 provides a system for allowing for ratioed rotation of the output shaft 22 due to rotation of the threaded shaft 16. Third, the linear actuator 10 may be utilized to actuate a flight control surface 12 of an aircraft 13 and/or a variety of other structures in various applications.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

10 linear actuator
12 flight control surface
13 aircraft
14 electric motor
14A first electric motor
14B second electric motor
16 threaded shaft
18 threaded shaft pivot axis
20 threaded nut
20A first threaded nut
20B second threaded nut
22 output shaft
24 output shaft pivot axis
26 gear train
26A first gear train
26B second gear train
28 gearset/planetary gearset
28A first gearset/planetary gearset
28B second gearset/planetary
30 threads
30A first threads
30B second threads
32 bearings
33 housing
34 outer body
36 connection assembly
38 input coupler
38A first input coupler
38B second input coupler
40 output coupler
40A first output coupler
40B second output coupler
42 coupler link
42A first coupler link
42B second coupler link
44 pivot axis of output coupler
46 pivot axis of input coupler
48 pivot axis of coupler link relative to input coupler
50 pivot axis of coupler link relative to output coupler
52 intermediate positions
54 intermediate rotational position
56 linearly convergent positions
58 first rotational position
60 linearly divergent positions
62 second rotational position

What is claimed is:

1. A linear actuator for a flight control surface, comprising:
at least one electric motor;
a threaded shaft rotationally driven via the at least one electric motor about a threaded shaft pivot axis;
a first threaded nut axially displaced via rotation of the threaded shaft;
a second threaded nut axially displaced via rotation of the threaded shaft; and
an output shaft operably coupled to the threaded shaft, such that axial displacement of the first and second threaded nuts rotates the output shaft about an output shaft pivot axis that is substantially parallel with the threaded shaft pivot axis, wherein rotation of the threaded shaft in a first rotational direction via the at least one electric motor prompts movement of the first and second threaded nuts axially toward each other, and rotation of the threaded shaft in a second rotational direction opposite the first rotational direction via the at least one electric motor prompts movement of the first and second threaded nuts axially away from each other.

2. The linear actuator of claim 1, wherein the first and second threaded nuts are hingedly connected to the output shaft.

3. The linear actuator of claim 1, further comprising:
a first input coupler pivotably coupled to the first threaded nut;
a second input coupler pivotably coupled to the second threaded nut;
at least one output coupler pivotably coupled to the output shaft;
at least one first coupler link pivotably coupled to the first input coupler and the at least one output coupler; and
at least one second coupler link pivotably coupled to the second input coupler and the at least one output coupler.

4. The linear actuator of claim 3, wherein the at least one output coupler is pivotably coupled with the output shaft, such that the at least one output coupler is operable to pivot relative to the output shaft about a pivot axis that is substantially parallel to the output shaft pivot axis.

5. The linear actuator of claim 4, wherein the first input coupler is pivotably coupled to the first threaded nut, such that the first input coupler is operable to pivot relative to the first threaded nut about a pivot axis that is substantially parallel to the threaded shaft pivot axis, and the second input coupler is pivotably coupled to the second threaded nut, such that the second input coupler is operable to pivot relative to the second threaded nut about a pivot axis that is substantially parallel to the threaded shaft pivot axis.

6. The linear actuator of claim 5, wherein the at least one first coupler link is pivotably coupled to the first input coupler and pivotably coupled to the at least one output coupler, such that the at least one first coupler link is operable to pivot relative to the first input coupler about a pivot axis that is substantially perpendicular to the threaded shaft pivot axis and pivot relative to the at least one output coupler about a pivot axis that is substantially perpendicular to the output shaft pivot axis, and wherein the at least one second coupler link is pivotably coupled to the second input coupler and pivotably coupled to the at least one output coupler, such that the at least one second coupler link is operable to pivot relative to the second input coupler about a pivot axis that is substantially perpendicular to the threaded shaft pivot axis and pivot relative to the at least one output coupler about a pivot axis that is substantially perpendicular to the output shaft pivot axis.

7. The linear actuator of claim 3, wherein the at least one output coupler includes a first output coupler pivotably coupled with the output shaft, and a second output coupler pivotably coupled with the output shaft independently of the first output coupler, and wherein the at least one first coupler link is pivotably coupled with the first output coupler, and the at least one second coupler link is pivotably coupled with the second output coupler.

8. The linear actuator of claim 3, wherein the at least one first coupler link includes a pair of first coupler links, each being pivotably coupled to the first input coupler and pivotably coupled to the at least one output coupler.

9. The linear actuator of claim 8, wherein the at least one second coupler link includes a pair of second coupler links, each being pivotably coupled to the second input coupler and pivotably coupled to the at least one output coupler.

10. A linear actuator for a flight control surface, comprising:

first and second electric motors;

a threaded shaft rotationally driven via the first and second electric motors about a threaded shaft pivot axis, wherein the threaded shaft is operably coupled with the first electric motor via a first gear train and a first planetary gearset, and the threaded shaft is operably coupled with the second electric motor via a second gear train and a second planetary gearset;

a first threaded nut axially displaced via rotation of the threaded shaft;

a second threaded nut axially displaced via rotation of the threaded shaft; and an output shaft operably coupled with the threaded shaft, such that axial displacement of the first and second threaded nuts rotates the output shaft about an output shaft pivot axis that is substantially parallel with the threaded shaft pivot axis.

11. The linear actuator of claim 10, wherein rotation of the threaded shaft in a first rotational direction via the first and second electric motors prompts movement of the first and second threaded nuts axially toward each other, and rotation of the threaded shaft in a second rotational direction opposite the first rotation direction via the first and second electric motors prompts movement of the first and second threaded nuts axially away from each other.

12. The linear actuator of claim 10, wherein the first and second threaded nuts are hingedly connected to the output shaft.

13. The linear actuator of claim 10, further comprising:

a first input coupler pivotably coupled to the first threaded nut;

a second input coupler pivotably coupled to the second threaded nut;

at least one output coupler pivotably coupled to the output shaft;

at least one first coupler link pivotably coupled to the first input coupler and the at least one output coupler; and at least one second coupler link pivotably coupled to the second input coupler and the at least one output coupler.

14. The linear actuator of claim 13, wherein the at least one output coupler is pivotably coupled with the output shaft, such that the at least one output coupler is operable to pivot relative to the output shaft about a pivot axis that is substantially parallel to the output shaft pivot axis.

15. The linear actuator of claim 14, wherein the first input coupler is pivotably coupled to the first threaded nut, such that the first input coupler is operable to pivot relative to the first threaded nut about a pivot axis that is substantially parallel to the threaded shaft pivot axis, and the second input coupler is pivotably coupled to the second threaded nut, such that the second input coupler is operable to pivot relative to the second threaded nut about a pivot axis that is substantially parallel to the threaded shaft pivot axis.

16. The linear actuator of claim 15, wherein the at least one first coupler link is pivotably coupled to the first input coupler and pivotably coupled to the at least one output coupler, such that the at least one first coupler link is operable to pivot relative to the first input coupler about a pivot axis that is substantially perpendicular to the threaded shaft pivot axis and pivot relative to the at least one output coupler about a pivot axis that is substantially perpendicular to the output shaft pivot axis, and wherein the at least one second coupler link is pivotably coupled to the second input coupler and pivotably coupled to the at least one output coupler, such that the at least one second coupler link is operable to pivot relative to the second input coupler about a pivot axis that is substantially perpendicular to the threaded shaft pivot axis and pivot relative to the at least one output coupler about a pivot axis that is substantially perpendicular to the output shaft pivot axis.

17. A linear actuator, comprising:

at least one electric motor;

a threaded shaft rotationally driven via the at least one electric motor about a threaded shaft pivot axis;

at least one threaded nut axially displaced along the threaded shaft pivot axis via rotation of the threaded shaft;

an output shaft operably coupled to the threaded shaft, such that axial displacement of the at least one threaded nut rotates the output shaft about an output shaft pivot axis that is substantially parallel with the threaded shaft pivot axis;

a first input coupler pivotably coupled to the at least one threaded nut;

at least one output coupler pivotably coupled to the output shaft; and at least one first coupler link pivotably coupled to the first input coupler and the at least one output coupler, wherein the first input coupler is operable to pivot relative to the at least one threaded nut about a pivot axis that is substantially parallel to the threaded shaft pivot axis, the at least one output coupler is operable to pivot relative to the output shaft about a pivot axis that is substantially parallel to the output shaft pivot axis, and the at least one first coupler link is operable to pivot relative to the first input coupler about a pivot axis that is substantially perpendicular to the threaded shaft pivot axis and pivot relative to the at least one output coupler about a pivot axis that is substantially perpendicular to the output shaft pivot axis.

18. The linear actuator of claim 17, wherein the at least one threaded nut is hingedly connected to the output shaft.

* * * * *